United States Patent [19]

Balsiger et al.

[11] Patent Number: 4,725,226
[45] Date of Patent: Feb. 16, 1988

[54] DEVICE FOR ACTIVATING THE COMBUSTION PROCESS

[75] Inventors: Benno Balsiger, via al mulino, Cadempino, Switzerland, CH-6814; Primo D. Richina, Cadempino, Switzerland

[73] Assignee: Benno Balsiger, Cadempino, Switzerland

[21] Appl. No.: 890,773
[22] PCT Filed: Nov. 15, 1985
[86] PCT No.: PCT/CH85/00164
§ 371 Date: Jul. 15, 1986
§ 102(e) Date: Jul. 15, 1986
[87] PCT Pub. No.: WO86/02987
PCT Pub. Date: May 22, 1986

[30] Foreign Application Priority Data
Nov. 16, 1984 [CH] Switzerland .......................... 5476/84
[51] Int. Cl.⁴ .............................................. F23D 14/64
[52] U.S. Cl. ......................................... 431/354; 431/4; 123/25 A
[58] Field of Search ................. 431/4, 354; 123/25 A, 123/25 F

[56] References Cited

U.S. PATENT DOCUMENTS

| 1,997,763 | 4/1935 | Boesch . | |
|---|---|---|---|
| 3,865,907 | 2/1975 | Rock | 261/18 A |
| 3,875,922 | 4/1975 | Kirmss | 123/25 R |
| 4,030,456 | 6/1977 | Corpus | 123/25 B |
| 4,144,015 | 3/1979 | Berthiaume | 431/8 |
| 4,173,450 | 11/1979 | Schrank | 431/190 |
| 4,376,739 | 3/1983 | Passey | 261/142 |
| 4,538,981 | 9/1985 | Venturini | 431/190 |

FOREIGN PATENT DOCUMENTS 2359414 11/1974 Fed. Rep. of Germany .
3049362 7/1982 Fed. Rep. of Germany .

OTHER PUBLICATIONS

European Patent Application 50 258, Apr. 1982, Inventor Andrea Venturini.

Primary Examiner—Carroll B. Dority, Jr.
Attorney, Agent, or Firm—Ralph W. Selitto, Jr.

[57] ABSTRACT

A device is disclosed which is especially adapted for use in activating the combustion process in combustion systems equipped with a combustion chamber supplied with solid, liquid or gaseous fuel. The device employs a container which is partially filled with water and which is supplied with compressed air such that the compressed air flows through the water before being delivered to the combustion chamber, whereby the air is made moist. On its way to the combustion chamber, the moist air flows through a chamber containing a buffer liquid. A conduit extends between the chamber containing the buffer liquid and another chamber, the conduit having a transmission cross section selected such that a shock-absorbing function is performed.

18 Claims, 3 Drawing Figures

DEVICE FOR ACTIVATING THE COMBUSTION PROCESS

The invention relates to a device for activating a combustion process and, more particularly, to such a process which increases the $CO_2$ content and reduces the soot index in combustion systems supplied with solid, liquid or gaseous fuel.

When, in conjunction with combustion systems, reference is made to improving the quality of combustion, the intention is principally that the fuel consumption should be reduced and accordingly energy should correspondingly be saved. In addition to this aspect, however, in the case of modern systems the intention is also to give consideration to practical aspects from the technical point of view, such as easier and improved cleaning of the boilers and combustion chambers used, so as to remove soot and deposits, optimization of the energy exchange and output capacity, the achievement of a more favorable efficiency of the combustion system by changes to the flame geometry, reduction of the emission of fumes and solid particles, as well as elimination of possible causes of corrosion. The measures and devices which have to date become known for the improvement of the above-mentioned process and system components are in general associated with large capital expenditure, which is an obstacle to widespread application.

By the European Patent Application No. 50 258, a combustion catalytic unit is known, according to which a regulating device is disposed between a water container and a combustion zone. In the operation of this arrangement, there is the disadvantage that the pressure shocks occurring on ignition of the fuel and on switching over from one stage to the other are propagated to the buffer filling of the regulating device, so that buffer liquid passes into the water container.

From German Pat. No. 2,359,414, a device for the introduction of steam into the fuel feed system of an internal combustion engine is known, by means of which the efficiency of combustion of the fuel is to be improved and the emission of noxious substances is to be reduced. In this known device, the steam generated in a container is supplied through a hollow idling setting screw of the carburetor of the internal combustion engine. In order to provide protection against an undesired reverse flow or against misfire reactions from the carburetor, at one end section of the idling setting screw a ball retaining valve is provided, the valve ball of which is controllable alone by the gas current. Such a reaction system has only a slight protection value, and is accordingly clearly unsuitable for use in furnaces.

The object of the invention consists in particular in providing measures, with the avoidance of the disadvantages of the prior art in the device of the initially mentioned type, which permit the achievement of an activation, showing an overall improvement, of the combustion process and at the same time decisively optimize the operational security.

This object and other objects are achieved by replacing the combustion air required for the burner of a combustion system with a mixture of the ambient air which is conventionally employed and air which is activated by a device constructed in accordance with the present invention. By means of investigations of the fumes at the outlet of a boiler, it was established that this activation or enrichment of the total combustion air supplied causes a considerable reduction of fuel consumption with a comparably high output power. As regards the combustion process, it has become evident that the conventional excess of air could be reduced and thus the pyrotechnic efficiency could be increased and stabilized. Already after approximately 200 to 300 hours of operation of the burner of a boiler which had up to that time been operated conventionally, when the enrichment was commenced it was possible to observe a considerable self-cleaning effect in the combustion chamber, so that the conventionally occurring deposits of soot and combustion residues had virtually disappeared. Instead of this, there was a fine white layer, which could be removed without further ado by means of a brush, which also provides a decisive advantage from the point of view of maintenance techniques.

The reduction of the excess air is of significance from the point of view of environmental aspects, since it results in a reduction of the heat losses caused by the fumes. The entire combustion process takes place, as it were, with an approximately stoichiometric air ratio.

As a result of the self-cleaning effect, achieved in accordance with the present invention, of the combustion chamber and the fumes emitted, the condition of the exchange surface between the fuel and the combustion chamber is also improved, whereby the efficiency of the boiler as an energy converter is increased and at the same time the primary energy requirement is reduced.

As a result of the present invention, the flame temperature also increases, the extent of the flame becomes smaller, and the chemical structure of the oxygen carrier, combustion air, changes. As a whole, the invention reduces the quantity of noxious substances in the order of magnitude of 15 to 25%, with a corresponding reduction of the output of $NO_x$. As a consequence of the reduced fuel consumption, the output of $SO_2$ is also reduced.

It has furthermore become evident that the use of the present invention in combustion systems has a certain dependence upon the external temperature of a building to be heated, and specifically in such a manner that, in the case of relatively low external temperatures, a proportionate increase in the reduction of the consumption takes place. This phenomenon is explained, on the one hand, by the increased flame temperature and, on the other hand, by the self-cleaning of the combustion chamber, which improves the combustion chamber/liquid fuel energy conversion. It could be established empirically that the association of these two effects led to a situation in which the target values set at boiler thermostats were reached more rapidly than when the present invention was switched off. As a result of this, the period of operation of the burner was reduced and the frequency of switching-on was increased. The observed effects are comparable with an artificial increase in power of the burner, as is the case when the maximum fuel supply is exceeded. The present invention thus permits an overall reduction of the control of the fuel supply and thus, above all, a reduction of the minimum fuel supply.

The control device employed in connection with the present invention is, as a whole, constructed in a simple manner and, just for that reason, exhibits a high degree of operational safety. A change in the level of the buffer liquid, which necessarily takes place in the event of any possible operational failure, leads to an immediate shutdown of the burner, so that the use of the present invention can be regarded, for a practical purpose, as being without risk.

An exemplary embodiment of the device according to the invention will be described below, with reference to the accompanying drawing.

Figure 1:
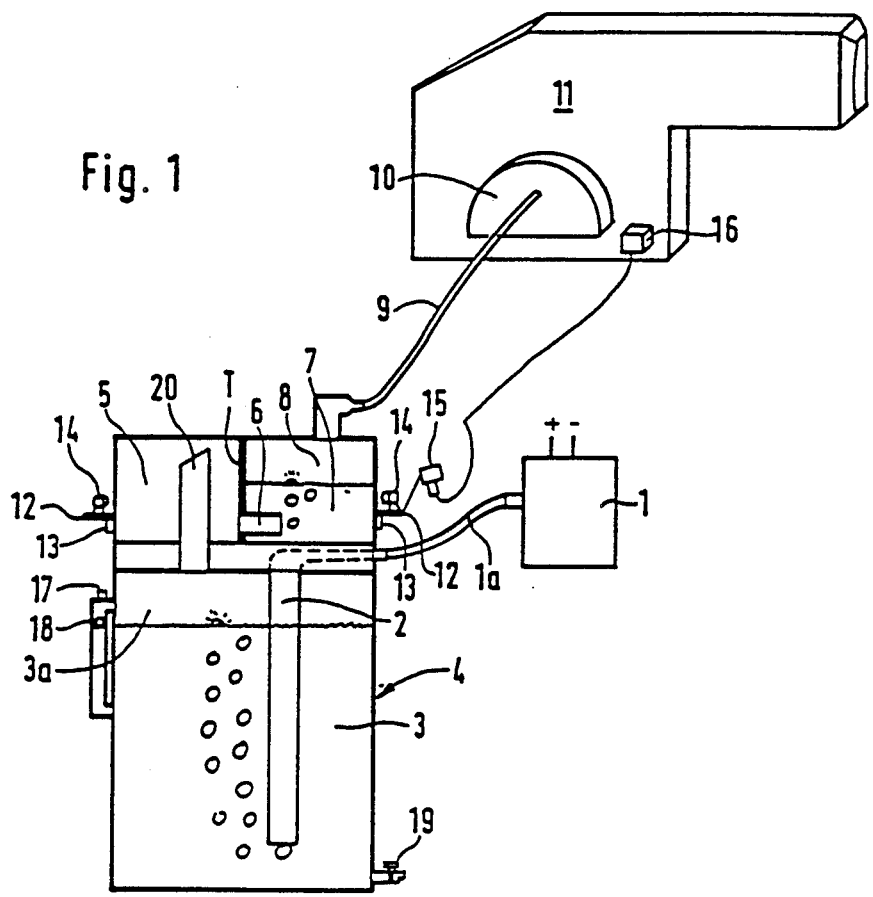
FIG. 1 is a schematic sectional representation of such a device.

According to FIG. 1, a container 4 is connected via a line 1a to an air pump 1 which pumps compressed air through one or more tubes 2 into a liquid 3 contained in the container 4. The liquid 3 fills only part of the space within the container, so that an air space 3a remains above the liquid level.

The upper section of the container 4 accommodates a pressure equalization chamber 5, which is separated by a separating wall T from a further chamber 8, which is partially filled with oil 7. A tube 6, which is disposed in the separating wall T and which connects the two chambers 5 and 8, serves for the passage of air and in this connection fulfils a type of shock-absorber function.

By means of a line 9, the chamber 8 is connected to the burner 11, where it opens into the air suction connection 10.

By means of the air pump 1, air is pumped through one or more tubes 2 through the active liquid 3 into the container 4.

The air which is activated on passing through the liquid is subsequently pressed through the pressure equalization chamber 5 and the tube 6 with a small diameter and shock-absorber function 6.

After flowing through the oil 7 and the second chamber 8, the activated air is mixed by means of the connecting hose 9 with the intake air of the burner 11.

For functional security, an electronic circuit is mounted on a plate 12 with height adjustment 13.

Monitoring of the level takes place by means of sensors 14 by ultrasound, light, infrared etc.

In the event of a leak or failure of the air pump 1, the oil level becomes equalized in the chambers 5 and 8, since the oil 7 flows through the tube 6 into the pressure equalization chamber 5. The level which has now decreased is recorded by the sensors 14; the electronic system connected thereto switches off the burner 11 by means of a relay 15 and the burner control system 16.

Laterally of the container 4 there is situated a filling connection 17, which is secured on a level control device 18.

A drainage tap 19 is provided at the lower part of the tank.

The device is suitable for activating the combustion process in furnaces for the combustion of fossil fuels such as oil, gas, coal and wood etc., but also in Otto and Diesel engines. In this connection, there is a virtually complete combustion of the hydrocarbons and a greatly reduced soot index.

The water filling of the container 4 contains distilled water with 2 to 12 volume %, preferably 5%, methyl alcohol.

Tests have shown that the device produces a surprising acceleration of ignition, associated with a complete combustion of the hydrocarbons.

The action of the activator on the oil, gas and coal combustion may be summarized in the following terms:

There is the possibility of operating the furnace without excess air.

Self-cleaning of the boiler.

An increase in the pyrotechnic efficiency.

An increase in the boiler efficiency.

The possibility of operating over-dimensioned systems in the partial-load range without increasing the losses due to fumes, which leads to an increase in the annual efficiency.

Reduction of the mass of fumes.

Reduction of sulfuric acid ($H_2SO_4$) = extension of the life of the boiler.

Reduction of the nitrogen oxides.

Reduction of carbon monoxide.

Figure 3:
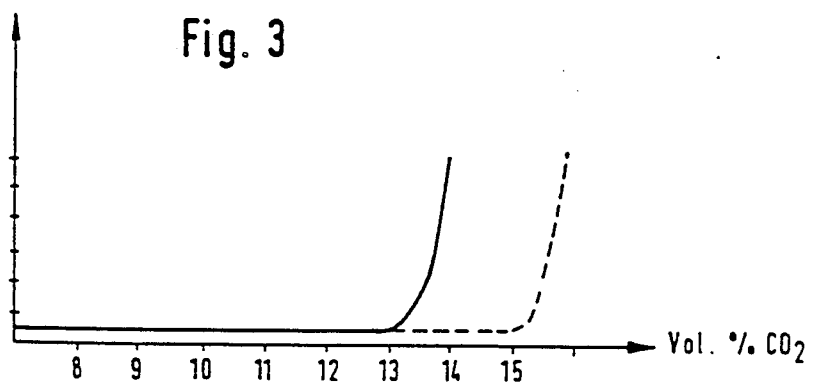
FIG. 3 illustrates the action of the device with reference to a diagram, which shows the $CO_2$ content of the fumes as a function of the soot index according to Bacharach.
Figure 2:
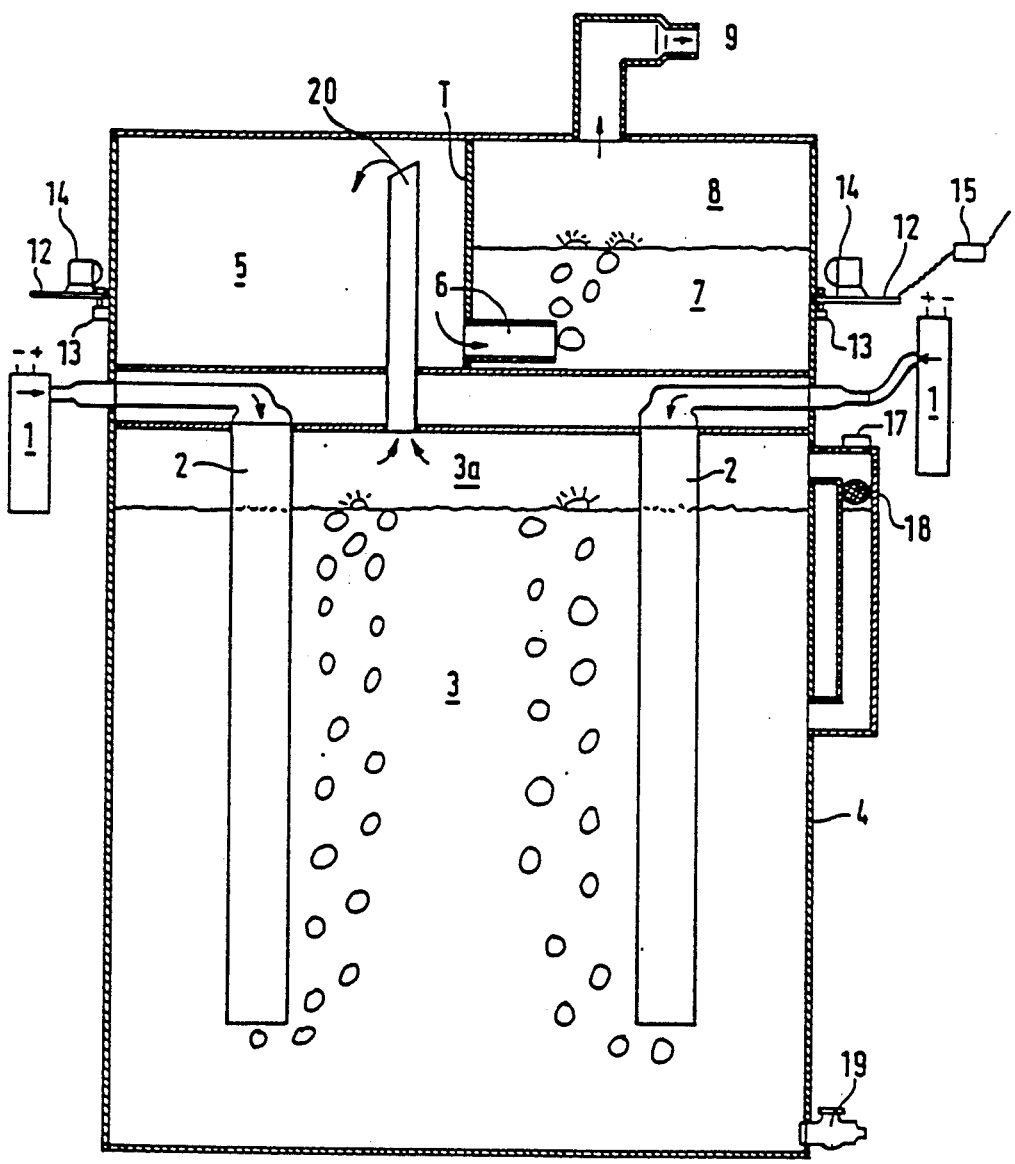
FIG. 2 shows, likewise in section, an enlarged detail of the same, with two blast tubes.

FIG. 3 shows the $CO_2$ content of the fumes as a function of the soot index according to Bacharach, in the case of an oil-fired system, which was equipped with an embodiment of the device according to the invention.

EXAMPLE

Oil-fired system with fuel oil EL
$CO_2$ maximum 15.3 vol. %
Minimum air requirement 14.5 kg/kg fuel $$\eta \text{ pyrotechnic} = 100 - \left[ \frac{(TA - TE)}{CO_2} \times .58 \right]$$

In this connection, the following values were obtained:

|  | λ 1.25 | λ 1.0 |
| --- | --- | --- |
| Mass of fumes | 19.18 kg/kg fuel | 15.5 kg/kg fuel |
| $CO_2$ | 12.2 vol. % | 15.3 vol. % |
| Temp. of fumes (TA) | 240° C. | 210° C. |
| Room temperature (TE) | 20° C. | 20° C. |
| η pyrotechnic | 89.5 | 92.8 |

We claim:

1. A device for activating the combustion process in combustion systems equipped with a combustion chamber, which is supplied with solid, liquid or gaseous fuel, to thereby increase the percentage content of $CO_2$ and decrease the soot index, comprising a container, which is partially filled with water such that an air space is formed above the level of the water contained in said container; at least one tube having an inlet, which is connected to a source of compressed air, and an outlet, which is positioned in said container below the level of the water contained therein, whereby air discharged from said outlet of said at least one tube becomes moist as it passes through the water contained in said container to said air space therein; a first chamber; a first conduit having an inlet, which communicates with said air space in said container, and an outlet, which communicates with said first chamber; a second chamber, which is partially filled with a buffer liquid; separating means for separating said first chamber from said second chamber; delivering means for delivering moist air from said air space of said second chamber to the combustion chamber; a second conduit mounted in said separating means and having an inlet, which communicates with said first chamber, and an outlet, which communicates with said second chamber below the level of the buffer liquid contained therein, whereby moist air from said first chamber passes through the buffer liquid contained in said second chamber on its way to said air space in said second chamber, said second conduit having a transmission cross section selected such that a shock-absorbing function is performed.

2. The device as claimed in claim 1, wherein said second conduit provides the only flow path for air passing from said first chamber to said second chamber.

3. The device as claimed in claim 2, wherein said first and second chambers have a common floor and a common roof, said second conduit being positioned in the vicinity of said floor.

4. The device as claimed in claim 3, wherein said delivering means communicates with said second chamber through said roof.

5. The device as claimed in claim 4, wherein said outlet of said first conduit is positioned in the vicinity of said roof.

6. The device as claimed in claim 5, wherein the buffer liquid occupies said first and second chambers when said device is not in operation but is ready for operation, the level of the buffer liquid contained in said second chamber being equal to the level of the buffer liquid contained in said first chamber and being above said second conduit.

7. The device as claimed in claim 6, wherein the level of the liquid in said second chamber rises during the operation of the device in response to the varying pressures in said first and second chambers.

8. The device as claimed in claim 7, wherein said first and second chambers have box-shaped cross sections.

9. The device as claimed in claim 8, wherein said first and second chambers are located above said container.

10. The device as claimed in claim 9, wherein said first and second chambers are formed integrally with said container.

11. The device as claimed in claim 1, wherein said second conduit functions so as to absorb pressure shocks occurring in the combustion chamber and thereby inhibit the transfer of the buffer liquid into said container.

12. The device as claimed in claim 1, wherein said second chamber includes sensing means for sensing the level of the buffer liquid contained in said second chamber.

13. The device as claimed in claim 12, wherein the buffer liquid is oil and said sensing means operates on the basis of ultrasound, infrared radiation or light radiation.

14. The device as claimed in claim 13, further comprising controlling means for controlling the operation of the combustion chamber in response to the level of the buffer liquid sensed by sensing means, whereby the operation of the combustion chamber can be terminated in the event that the level of the buffer liquid deviates from a predetermined level.

15. The device as claimed in claim 1, wherein said separating means is a wall common to said first and second chambers.

16. The device as claimed in claim 1, wherein said delivering means is a hose.

17. The device as claimed in claim 1, wherein the water contained in said container includes distilled water with 2 to 12%, preferably about 5%, methyl alcohol.

18. The device as claimed in claim 1, wherein said at least one tube includes a plurality of tubes.

* * * * *